Figure 1:
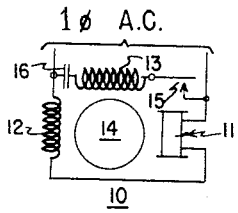

April 3, 1951      A. J. LEWUS      2,547,131

ELECTROMAGNETIC RELAY

Filed Dec. 30, 1949

Inventor
Alexander J. Lewus

By

*Smith, Olsen & Baird*

Attys.

Patented Apr. 3, 1951

2,547,131

UNITED STATES PATENT OFFICE 2,547,131

ELECTROMAGNETIC RELAY

Alexander Jay Lewus, Cicero, Ill.

Application December 30, 1949, Serial No. 135,880

5 Claims. (Cl. 175—345)

The present invention relates to electromagnetic relays, and more particularly to such relays of the current responsive or marginal type that are especially suited for use in the control circuits of single phase induction motors of the split phase or capacitor type.

A single phase induction motor of the type noted usually comprises a stator having a main or run winding and an auxiliary or start winding, and a squirrel cage rotor. In order to start a motor of this type the run and start windings are connected to an associated source of single phase alternating current; and thereafter, as the rotor approaches its full speed, the start winding is disconnected from the source. The ultimate acceleration of the rotor on into its full speed is accomplished by the run winding that is connected to the source. Subsequently, in order to arrest operation of the motor, the run winding is merely disconnected from the source.

One circuit control arrangement for a motor of the type noted comprises an electromagnetic relay of the current responsive or marginal type that is provided with a field structure carrying a winding, an associated movable armature, and switch contacts controlled by the movements of the armature. The winding of the relay is connected in series circuit relation with the run winding of the motor across the terminals of the source; and the switch contacts of the relay are connected in series relation with the start winding of the motor across the terminals of the source; whereby the run winding and the start winding of the motor are respectively connected and disconnected with respect to the terminals of the source, when the rotor of the motor is at rest. When the control circuit is initially closed a heavy current traverses the winding of the relay and the series connected run winding of the motor, whereby the field structure of the relay attracts the armature effecting closure of the switch contacts so that the start winding of the motor is connected across the terminals of the source. Thus the run winding and the start winding of the motor are connected in parallel circuit relationship with respect to each other across the terminals of the source, whereby rotation of the rotor of the motor is initiated. As the rotor of the motor is accelerated toward its full speed the current traversing the winding of the relay and the run winding of the motor is reduced due to the corresponding increased impedance of the run winding of the motor, since the motor has a predetermined impedance-speed characteristic, the impedance of the run winding increasing with speed of the rotor. The relay, being of the current responsive or marginal type, responds to the reduced current traversing the winding thereof and the series connected run winding of the motor; whereby this current becomes insufficient to cause the field structure of the relay to retain the armature in its attracted position, when the rotor of the motor is accelerated to a predetermined speed toward its full speed. Thus, at this time, the armature of the relay is released by the associated field structure effecting opening of the switch contacts so that the start winding of the motor is disconnected from across the terminals of the source.

It is immediately apparent that this circuit control arrangement for an electric motor of this type is satisfactory in operation only when the current responsive or marginal characteristic of the relay matches the impedance-speed characteristic of the motor fairly closely, whereby it is ordinarily necessary to design a relay to match the particular impedance-speed characteristic of each variety of electric motor of this type.

Accordingly, it is a general object of the present invention to provide an electromagnetic relay of the current responsive or marginal type that incorporates an improved arrangement for varying the current responsive or marginal characteristic thereof over a wide range, rendering the relay useful in control circuits for a wide variety of electric motors of the type noted.

Another object of the invention is to provide in an electromagnetic relay, an improved and simplified armature mounting and biasing arrangement.

A further object of the invention is to provide in an electromagnetic relay, an improved construction and arrangement of the armature and contact actuating mechanism thereof.

A still further object of the invention is to provide an electromagnetic relay of rugged construction and arrangement that is efficient in operation and economical to manufacture.

Further features of the invention pertain to the particular arrangement of the elements of the electromagnetic relay, whereby the above-outlined and additional operating features thereof are attained.

Figure 2:
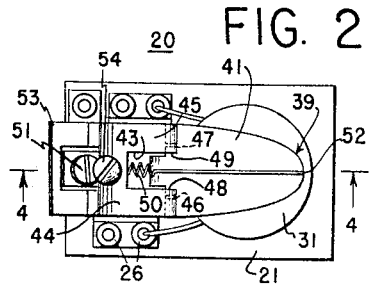
Figure 3:
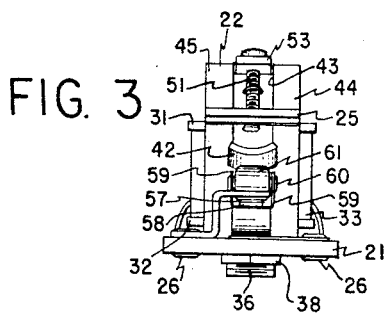
Figure 4:
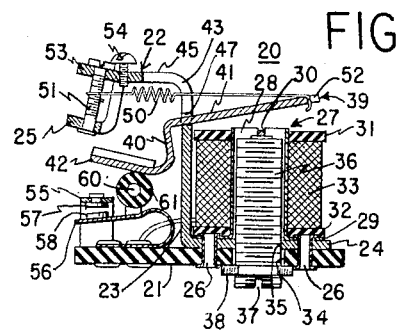
Figure 5:
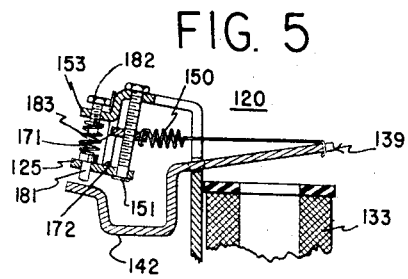
Figure 6:
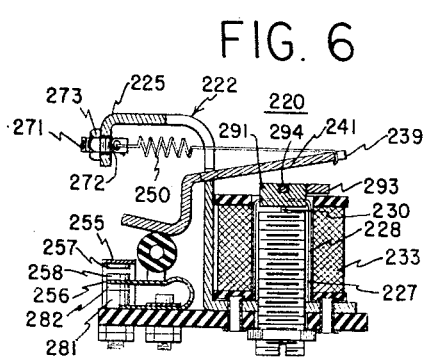
Figure 7:
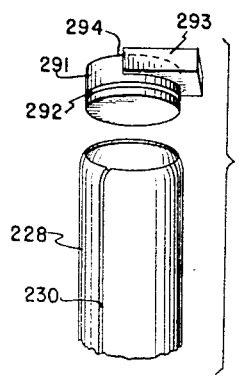

The invention, both as to its organization and method of operation, together with further objects and advantages thereof, will best be understood by reference to the following specification, taken in connection with the accompanying drawing in which Figure 1 is an electric diagram of a control circuit for a single phase induction motor of the split phase or capacitor type incorporating an electromagnetic relay embodying the present invention; Fig. 2 is a plan view of a relay embodying the present invention; Fig. 3 is an end view of the relay shown in Fig. 2; Fig. 4 is a vertical sectional view of the relay, taken in the direction of the arrows along the line 4—4 in Fig. 2; Fig. 5 is a fragmentary vertical sectional view of a modified form of the relay embodying the present invention; Fig. 6 is a vertical sectional view of another modified form of the relay embodying the present invention; and Fig. 7 is an enlarged exploded perspective view of a structural detail of the relay shown in Fig. 6.

Referring now to Fig. 1 of the drawing, there is illustrated diagrammatically an electric motor 10 of the single phase induction type that may comprise a split phase or capacitor type of operation, as well as a control circuit therefor including an electromagnetic relay 11 embodying the features of the present invention. The control circuit for the electric motor 10 is connected to a suitable source of single phase 60 cycle alternating current that may be of 110 volts by selectively controllable switching apparatus, not shown. Specifically, the electric motor 10 comprises a stator provided with a main or run winding 12 and an auxiliary or start winding 13, as well as a rotor 14 of the squirrel cage type. The relay 11 comprises magnetic field structure including a core element carrying a winding and a movable armature operatively connected to an associated pair of contacts 15. The run winding 12 of the motor 10 and the winding of the relay 11 are connected in series circuit relation across the terminals of the control circuit; and the start winding 13 and the contacts 15 are connected in series relation with an associated capacitor 16 and thence across the terminals of the control circuit. The armature of the relay 11 normally occupies its released position effecting opening of the contacts 15, whereby the start winding 13 is normally disconnected from across the terminals of the control circuit.

In order to start the motor 10 the associated switching apparatus is operated to its closed position in order to effect energization of the run winding 12 of the motor 10 and the winding of the relay 11. The relay 11, being of the current responsive or marginal type, attracts its armature closing the contacts 15, whereby the start winding 13 and the series connected capacitor 16 are bridged across the terminals of the control circuit. Thus at this time both the run winding 12 and the start winding 13 of the motor 10 are energized, whereby the circulating currents induced in the squirrel cage of the rotor 14 react with the magnetic fields produced by the windings 12 and 13 in order to initiate rotation of the rotor 14. As the rotor 14 is accelerated toward its full speed the current traversing the run winding 12 of the motor 10 and the winding of the relay 11 is reduced due to the increased impedance of the run winding 12 as a consequence of the rotation of the rotor 14, the motor 10 having a predetermined impedance-speed characteristic. When the current traversing the run winding 12 of the motor 10 and the winding of the relay 11 is reduced to a predetermined value, the field structure of the relay 11 releases its armature opening the contacts 15, whereby the start winding 13 of the motor 10 is disconnected from across the terminals of the control circuit. At this time the rotor 14 is accelerated on into its full speed by the run winding 12 alone. Subsequently, in order to arrest operation of the motor 10, the associated switching apparatus is operated to its open circuit position in order to de-energize the run winding 12.

In order to accommodate the electromagnetic relay 11 to a large variety of electric motors of the type noted, it is preferably of the construction and arrangement hereinafter described, whereby the current responsive or marginal characteristic of the relay 11 may be adjusted or varied to match the impedance-speed characteristic of a wide variety of motors of the type noted.

Referring now to Figs. 2 to 4, inclusive, the electromagnetic relay 20 there illustrated and embodying the features of the present invention, comprises a supporting plate 21 formed of insulating material, such, for example, as "Bakelite," and a substantially Z-shaped field element 22 formed of magnetic material and provided with a body 23 terminating in two oppositely directed arms 24 and 25. In the arrangement the arm 24 extends forwardly with respect to the adjacent lower end of the body 23, and the arm 25 extends rearwardly with respect to the adjacent upper end of the body 23. The arm 24 is suitably secured to the adjacent upper surface of the supporting plate 21 by an arrangement including a plurality of rivet eyelets 26 extending through aligned openings respectively provided in the plate 21 and in the arm 24. Also, a winding spool carrying element 27 formed of non-magnetic material, such, for example, as aluminum, is carried by the adjacent upper surface of the arm 24 and secured in place by the eyelets 26 extending through aligned openings provided therein. The winding spool carrying element 27 comprises an upstanding substantially cylindrical barrel 28 disposed forwardly with respect to the body 23 of the field element 22 and a lower substantially annular flange 29, the flange 29 being directly secured to the adjacent upper surface of the arm 24, as previously noted. Preferably, the barrel 28 of the element 27 has a longitudinally extending slit 30 formed therein in order to break the electrical circuit path around the barrel 28 so as to minimize eddy currents in the barrel 28 that may be induced therein when the winding provided on the associated winding spool is energized with alternating current.

Also, the relay 20 comprises a unitary winding spool and supported winding that is removably carried by the element 27, the heads of the winding spool being indicated at 31 and 32, and the winding being indicated at 33. The heads 31 and 32 of the winding spool are formed of insulating material, such, for example, as "Bakelite," and the composite winding 33 is formed of suitable conducting wire, such, for example, as copper, or the like, the individual terminals of the composite winding 33 being suitably insulated from each other.

Aligned openings 34 and 35 are respectively formed in the plate 21 and in the arm 24, the openings 34 and 35 being arranged in alignment with the hollow barrel 28 of the element 27. The opening 35 is threaded and engages the threaded exterior surface of a core element 36 projecting through the openings 34 and 35 and arranged within the barrel 28. The core element 36 is formed of magnetic material and the upper end thereof comprises a pole end terminating adjacent to the upper end of the barrel 28. It will be understood that the pole end of the core element 36 may be adjusted with respect to the upper end of the barrel 28 by virtue of the arrangement previously noted, the lower end of the core element 36 having a slot 37 formed therein that is adapted to receive a screwdriver, or the like, to facilitate the adjustments noted. Also, the lower end of the core element 36 carries a lock nut 38 so that the adjusted position of the core element 36 within the barrel 28 may be retained by virtue of the cooperation between the lock nut 38 and the adjacent lower surface of the plate 21.

Further, the relay 20 comprises an armature 39 having a substantially Z-shape and including a body 40 terminating into oppositely directed arms 41 and 42. The arm 41 projects forwardly with respect to the associated upper end of the body 40 and constitutes the head of the armature 39 that cooperates with the associated pole end of the core element 36, while the arm 42 projects rearwardly from the associated lower end of the body 40 and constitutes the work lever of the armature 39. The armature 39 is formed of magnetic material and is pivotally mounted upon the upper portion of the body 23 of the field element 22 somewhat above the upper end of the barrel 28 and between the arms 24 and 25 of the field element 22. Specifically, a substantially centrally disposed opening 43 is formed in the upper portion of the field element 22 at the junction between the upper end of the body 23 and the arm 25, whereby two spaced-apart sides 44 and 45 extend between the upper end of the body 23 and the rear extremity of the arm 25. Further, two side notches 46 and 47 are respectively provided in the sides 44 and 45 adjacent to the bottom of the opening 43 that respectively receive two tabs 48 and 49 provided on the opposite sides of the armature 39 adjacent to the junction between the body 40 and the head 41 thereof. Thus, it will be understood that the arrangement, comprising the side notches 46 and 47 respectively provided in the lower portions of the sides 44 and 45 and merging into the opening 43 and respectively receiving the tabs 46 and 47 provided on the armature 39, mounts the armature 39 upon the field element 22 for pivotal movements, the head 41 of the armature 39 being selectively movable toward and away from the pole end of the core element 36 about the tabs 48 and 49 respectively riding in the side notches 46 and 47.

The armature 39 is normally biased in its released position illustrated by an arrangement comprising a tension element or spring 50 projecting through the opening 43 and cooperating between the front end of the head 41 and a screw 51. More particularly, a substantially centrally disposed slot 52 is provided in the front end of the head 41 of the armature 39 that receives the front end of the spring 50, the front end of the spring 50 being arranged in the slot 52 and hooked over the lower surface of the head 41. The rear end of the arm 25 is curved first downwardly and then rearwardly and comprises a knockout tab 53 that is disposed above the extreme rear end of the arm 25, the screw 51 extending between the tab 53 and the extreme rear end of the arm 25 and receiving the rear end of the spring 50, the rear end of the spring 50 being provided with a hook engaging the threaded body of the screw 51.

As described above, the front end of the tension element 50 is pivotally connected to the front end of the head 41 in the slot 52, while the rear end of the tension element 50 is connected to the threaded body of the screw 51. Thus, it will be understood that when the screw 51 is rotated, the rear end of the tension element 50 rides upon the threaded body of the screw 51 effecting selective movements of the rear end of the tension element 50 up and down with respect to the front end thereof. Accordingly, the tension element 50 normally biases the armature 39 in the counterclockwise direction, as viewed in Fig. 4, about the pivotal mounting, including the tabs 48 and 49 riding in the cooperating side notches 46 and 47; and the moment of this bias exerted by the tension element 50 upon the front or free end of the head 41 is selectively varied or adjusted depending upon the position of the rear end of the tension element 50 upon the associated screw 51. Specifically, it will be appreciated that as the rear end of the tension element 50 is moved downwardly away from the tab 53 the angle between the tension element 50 and the head 41 is decreased, whereby the effective moment of the bias exerted by the tension element 50 upon the armature 39 is correspondingly decreased.

Recapitulating, it will be understood that with a given pull between the ends of the tension element 50 the effective moment of this pull that is exerted upon the armature 39 may be varied by varying the angle between the tension element 50 and the head 41 of the armature 39; which may be accomplished merely by an appropriate adjustment of the screw 51. Finally, a lock or set screw 54 is placed in a threaded opening provided in the tab 53 and arranged in cooperating relation with respect to the head of the screw 51 so that the adjusted position of the screw 51 may be preserved.

In view of the previous description of the arrangement for adjusting the position of the core element 36 with respect to the end of the barrel 28 and consequently with respect to the head 41 of the armature 39, it will be understood that the magnetic reluctance of the field structure including the field element 22 and the core element 36, and the armature 39 may be readily adjusted. The combination of the adjustment of the bias upon the armature 39 and the adjustment of the magnetic reluctance of the field structure permits a composite variation of the current responsive or marginal characteristic of the relay 20 over a wide range; whereby the relay 20 may be employed in the control circuits of a wide variety of the electric motors of the type noted. In other words, the characteristic of the relay 20 may be adjusted over a wide range in order to match it to the impedance-speed characteristic of a particular electric motor, the composite adjustment being obtained by the flexibility of the factors previously noted.

Finally, the relay 20 comprises a stationary switch spring 55 and a movable switch spring 56, both suitably mounted upon the plate 21 and insulated from each other. The switch springs 55 and 56 are formed of suitable electrical conducting material and preferably the movable switch spring 56 comprises considerable resiliency. The switch springs 55 and 56 respectively carry stationary and movable contacts 57 and 58 that may be formed of precious metal for the purpose of making and breaking the electrical circuit between the switch springs 55 and 56. Further, the switch spring 56 carries a pair of oppositely disposed upstanding arms 59 carrying a pin 60 extending therebetween upon which an insulating roller or bead 61 is mounted. The roller 61 may be formed of glass, or the like, and is readily rotatable upon the pin 60 in order to eliminate friction therebetween. The outer surface of the roller 61 is urged by the resiliency of the movable switch spring 56 into engagement with the adjacent lower surface of the work lever 42 of the armature 39.

When the armature 39 occupies its normal released position illustrated in Fig. 4, the work lever 42 engaging the outer surface of the roller 61 retrains the switch spring 56 in its lower position so that the contacts 57 and 58 are disengaged. When the armature 39 is moved into its attracted position with respect to the adjacent end of the barrel 28, it is pivoted in the clockwise direction, as viewed in Fig. 4, whereby the work lever 52 is effectively moved away from the pin 60 so that the outer surface of the roller 61 rolls upon the adjacent surface of the work lever 42 as the roller 61 follows the work lever 52 as a result of the resiliency of the switch spring 56, whereby the contact 58 is moved into engagement with the contact 57 closing the electric circuit between the switch springs 55 and 56. Subsequently, when the armature 39 is returned to its normal released position, as illustrated in Fig. 4, the work end of the lever 42 engaging the adjacent surface of the roller 61 forces the roller 61, as well as the pin 60 and the switch spring 56 downwardly, the outer surface of the roller 61 rolling upon the adjacent lower surface of the work lever 42, whereby the movable contact 58 again disengages the stationary contact 57 in order to open the electric circuit between the switch springs 55 and 56. This contact actuating mechanism including the roller 61 is very advantageous in view of the fact that a minimum amount of friction is involved in the transfer of motion between the work lever 42 and the movable switch spring 56.

It will be understood that the critical current that must traverse the winding 33 in order to effect movement of the armature 39 from its released position into its attracted position, as well as the critical current that must traverse the winding 33 in order to retain the armature 39 in its attracted position after it has been operated thereto, may be selectively adjusted, first by adjustment of the magnetic reluctance of the field structure including the core element 36, and second by adjustment of the moment of the bias of the tension element 50. Further, this current responsive or marginal characteristic may be adjusted externally thereof by providing a variable shunt circuit, not shown, bridging the terminals of the winding 33.

Referring now to Fig. 5 of the drawing, the modified form of the relay 120 there illustrated, and embodying the features of the present invention, comprises the essential construction of the relay 20, previously described. However, in this modification the arrangement for adjusting the moment of the bias applied by the tension element 150 between the front or free end of the armature 139 and the screw 151 comprises a nut 171 that is threaded upon the body of the screw 151 and is suitably attached to the rear end of the tension element 150. In this arrangement the nut 171 projects into an opening 172 provided in the rear end of the arm 125 in order positively to prevent rotation of the nut 171 incident to its travel along the body of the screw 151. This arrangement accomplishes the same general function as the corresponding arrangement incorporated in the relay 20 with regard to adjusting the moment of the bias applied to the armature 139.

Also, in the relay 120 there is incorporated a resilient buffer 181 projecting through an opening provided in the extreme rear end of the arm 125, the buffer 181 being mounted for sliding movement in the opening provided in the rear end of the arm 125 and cooperating with the extreme rear end of the work lever 142 of the armature 139. This arrangement further comprises an adjustable screw 182 arranged in a threaded opening formed in the tab 153, and a compression spring 183 extending between the adjacent ends of the buffer 181 and the screw 182. Thus, it will be understood that by adjustment of the screw 182 a variable bias may be established through the compression spring 183 upon the buffer 181, the rear end of the work lever 142 striking the adjacent end of the buffer 181 when the armature 139 is moved into its attracted position with respect to the associated core element, not shown. This arrangement is particularly useful in adjusting the critical current that must be maintained in the winding 133 of the relay 120 in order to retain the armature 139 in its attracted position after it has been operated thereto.

Referring now to Figs. 6 and 7, the other modified form of the relay 220 there illustrated, and embodying the features of the present invention, comprises the essential construction of the relay 20, previously described. However, in this modification the arrangement for adjusting the bias that is applied by the tension element 250 to the front or free end of the armature 239 comprises a simple threaded element 271 projecting through an associated opening 272 provided in the rear end of the arm 225 of the field element 222, and a cooperating nut 273. In this arrangement the tension in the spring 250 is directly adjusted by the position of the nut 273 upon the threaded element 271.

Also, in the relay 220 the movable contact spring 256 not only cooperates with the stationary contact spring 255, but also with a stationary contact 281. Specifically, the movable contact spring 256 carries the front contact 258 that cooperates with the front contact 257 that is carried by the fixed contact spring 255, as well as a back contact 282 that cooperates with the fixed back contact 281. Thus in the relay 220 two electric circuits may be alternately opened and closed by the respective contact pairs 257, 258 and 281, 282.

Finally, in the relay 220 the upper end of the barrel 228 of the winding spool carrying element 227 is inwardly flanged and receives a removable pole piece or button 291 that directly cooperates with the head 241 of the armature 239. In this arrangement the pole piece or button 291 is formed of magnetic material and is provided with a surrounding slot 292 that directly engages the inwardly flanged upper end of the barrel 228, the slot 230 formed in the barrel 228 lending sufficient resiliency to the connection to facilitate ready placement and removal of the button 291 from the front end thereof. In order further to minimize chattering of the head 241 of the armature 239 with respect to the pole piece 291 a low resistance shunting winding 293 formed of copper, or the like, is inductively coupled to one portion or leg of the pole piece 291 defined by a slot 294 formed therein. The low resistance winding 293 comprises a continuous ring and serves the usual purpose of conducting eddy currents therein in order to obtain a slight phase shift between the magnetic flux in the two portions or legs of the field piece 291 disposed on opposite sides of the slot 294, whereby chattering of the armature 239 is eliminated, when the winding 233 is energized with alternating current.

In view of the foregoing it is apparent that there has been provided an electromagnetic relay incorporating improved structure for varying the current responsive or marginal characteristic thereof over a wide range, thereby lending flexibility to the relay for use in the control circuits of a wide variety of single phase induction motors of the split phase or capacitor type.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electromagnetic relay comprising a substantially Z-shaped field element providing an upstanding body and a lower forwardly extending arm and an upper rearwardly extending arm, an upstanding core element secured to said forwardly extending arm and provided with a pole end terminating below said rearwardly extending arm, a winding carried by said core element, an armature, a pivotal connection between said armature and said body, said armature having a forwardly extending free end disposed above said pole end of said core element and being movable toward and away from said pole end of said core element about said pivotal connection, said body having a hole formed therein and disposed above said pivotal connection, a tension element disposed above said armature and projecting through said hole, a rotatable member carried by said rearwardly extending arm, one end of said tension element being connected to said member and the other end of said tension element being connected to said free end of said armature so that said tension element normally biases said free end of said armature away from said pole end of said core element about said pivotal connection, and means controlled by rotation of said member for selectively adjusting the position of said one end of said tension element different distances above said pivotal connection in order selectively to vary the moment of the bias exerted by said tension element upon said free end of said armature.

2. An electromagnetic relay comprising a substantially Z-shaped field element providing an upstanding body and a lower forwardly extending arm and an upper rearwardly extending arm, an upstanding core element secured to said forwardly extending arm and provided with a pole end terminating below said rearwardly extending arm, a winding carried by said core element, said body having an opening formed therein, an armature, a pivotal connection between the intermediate portion of said armature and said body within said opening so that one end of said armature extends forwardly and the other end of said armature extends rearwardly with respect to said body, said one end of said armature constituting a free end disposed above said pole end of said core element and being movable toward and away from said pole end of said core element about said pivotal connection and said other end of said armature constituting a movable work element, said body having a hole formed therein and disposed above said pivotal connection, a tension element disposed above said armature and projecting through said hole, a rotatable member carried by said rearwardly extending arm, one end of said tension element being connected to said member and the other end of said tension element being connected to said free end of said armature so that said tension element normally biases said free end of said armature away from said pole end of said core element about said pivotal connection, and means controlled by rotation of said member for selectively adjusting the position of said one end of said tension element different distances above said pivotal connection in order selectively to vary the moment of the bias exerted by said tension element upon said free end of said armature.

3. The electromagnetic relay set forth in claim 2, wherein a resilient element is arranged in cooperating relation with said work element, and a roller is mounted upon said resilient element and is forced thereby into rolling engagement with said work element.

4. The electromagnetic relay set forth in claim 1, wherein said core element projects through an aperture provided in said forwardly extending arm and is adjustable with respect thereto in order to effect adjustment of said pole end of said core element toward any away from said free end of said armature.

5. The electromagnetic relay set forth in claim 2, wherein said armature is substantially Z-shaped so that said free end of said armature and said work element comprise arms thereof respectively disposed above and below said pivotal connection.

ALEXANDER JAY LEWUS.

REFERENCES CITED

The following references are of record in the file of this patent:

UNITED STATES PATENTS

| Number | Name | Date |
|---|---|---|
| 682,377 | Wurmb et al. | Sept. 10, 1901 |
| 847,555 | Craft | Mar. 19, 1907 |
| 1,210,617 | Dunham | Jan. 2, 1917 |
| 1,914,909 | Creveling | June 20, 1933 |
| 1,987,555 | Foster | Jan. 8, 1935 |
| 2,068,494 | Kuhn | Jan. 19, 1937 |
| 2,241,838 | Wilson | May 13, 1941 |
| 2,318,359 | Bellows | May 4, 1943 |
| 2,425,092 | Fisher | Aug. 5, 1947 |
| 2,441,041 | Staszak | May 4, 1948 |

FOREIGN PATENTS

| Number | Country | Date |
|---|---|---|
| 327,179 | Germany | Mar. 14, 1919 |
| 539,329 | France | Mar. 31, 1922 |
| 695,555 | Germany | Aug. 1, 1940 |
| 704,026 | Germany | Feb. 20, 1941 |
| 226,111 | Switzerland | June 26, 1943 |